(12) United States Patent
Liao

(10) Patent No.: US 6,438,965 B1
(45) Date of Patent: Aug. 27, 2002

(54) INSTANT COLD PACK

(76) Inventor: Wen Hu Liao, P.O. Box 487, Chang-Hua City, 500 (TW)

(*) Notice: Subject to any disclaimer, the term of this patent is extended or adjusted under 35 U.S.C. 154(b) by 0 days.

(21) Appl. No.: 09/755,128

(22) Filed: Jan. 8, 2001

(30) Foreign Application Priority Data

Oct. 19, 2000 (TW) .......................................... 89121885 A

(51) Int. Cl.⁷ .................................................. F25D 5/02

(52) U.S. Cl. .............................................. 62/4; 62/530

(58) Field of Search ........................................ 62/4, 530

(56) References Cited

U.S. PATENT DOCUMENTS

| | | | | | |
|---|---|---|---|---|---|
| 1,894,775 A | * | 1/1933 | Levenson | .......................... | 62/4 |
| 3,865,117 A | * | 2/1975 | Perry, III | ............................ | 62/4 |
| 3,977,202 A | * | 8/1976 | Forusz et al. | ...................... | 62/4 |

* cited by examiner

*Primary Examiner*—Ronald Capossela

(57) ABSTRACT

A plastic cold pack comprises a water bag and a coolant consisting of ammonium, nitrate sodium carboxyl methyl cellulose, and sodium chloride. In use, press or knead the cold pack to break the water bag. Instantly, a chemical reaction occurs as the coolant mixes with water released from the water bag. Such chemical reaction is capable of cooling a contact object at about 26° C. instantly for serving as a soothing means in an emergency.

3 Claims, 1 Drawing Sheet

INSTANT COLD PACK

FIELD OF THE INVENTION

The present invention relates to cold packs and more particularly to a cold pack capable of cooling a contact object at about 26° C. instantly.

BACKGROUND OF THE INVENTION

A conventional cold pack implemented as a rubber/plastic bag filled with water. Such cold pack is typically stored in a freezer. However, the previous cold pack suffered from several disadvantages. For example, the time required for freezing water as ice is relatively long. As such, the soothing effect of the cold pack is not good if there is an emergency occurred before water completely turns into ice. Further, the precious space of freezer is somewhat wasted for storing the cold pack. Furthermore, the solid (i.e., iced) cold pack is not appropriate for some emergencies. Moreover, the iced cold pack is not appropriate to carry because it will melt after leaving the freezer.

SUMMARY OF THE INVENTION

It is thus an object of the present invention to provide a plastic cold pack comprising a small water bag and a coolant consisting of 98% ammonium, nitrate 1% sodium carboxyl methyl cellulose, and 1% sodium chloride. In use, press or knead the cold pack to break the water bag. Instantly, a chemical reaction occurs as the coolant mixes with water released from the water bag. Such chemical reaction is capable of cooling a contact object at about 26° C. instantly for serving as a soothing means in an emergency.

It is another object of the present invention to provide an instant cold pack wherein the constituents of the coolant are organic chemicals such that the used coolant may be diluted by water to serve as fertilizer for raising plants. This is an environmental protection functionality.

The above and other objects, features and advantages of the present invention will become apparent from the following detailed description taken with the accompanying drawings.

DETAILED DESCRIPTION OF THE PREFERRED EMBODIMENTS

Figure 1:
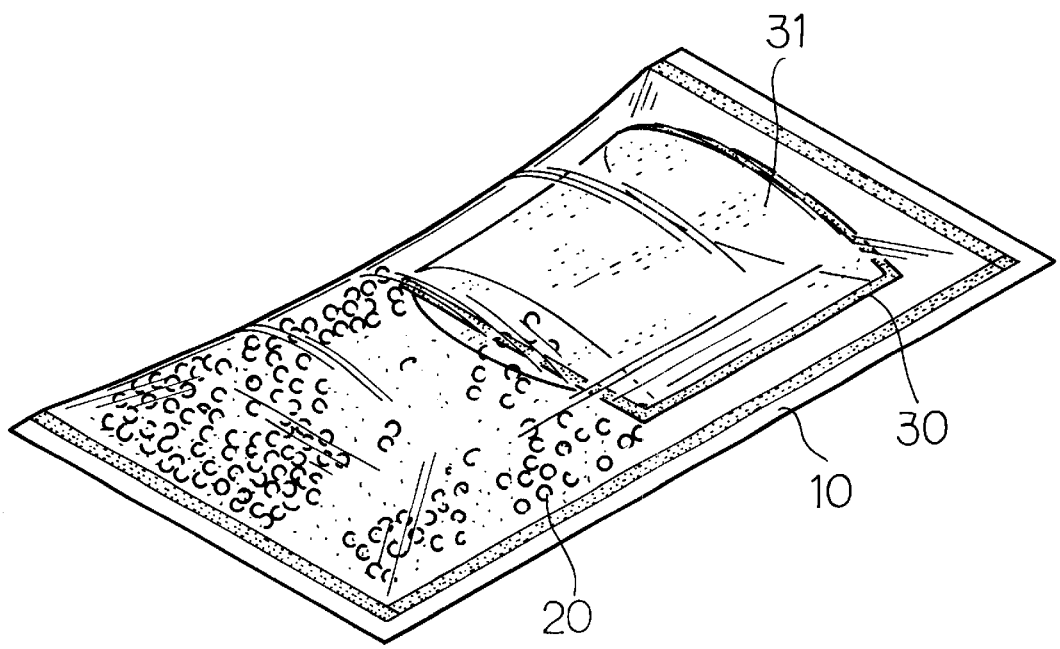
FIG. 1 is a perspective view of an instant cold pack according to the invention.
Figure 2:
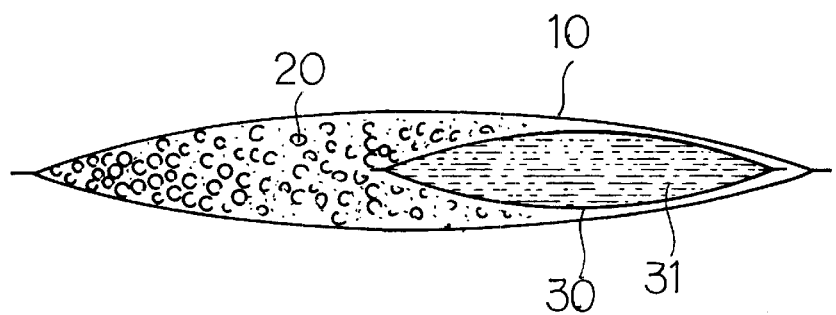
FIG. 2 is a cross-sectional of the FIG. 1 cold pack.

Referring to FIGS. 1 and 2, there is shown an instant cold pack constructed in accordance with the invention implemented as a plastic bag 10 comprising coolant 20 and a small water bag 30 filled with water ($H_2O$) 31. Preferably, the weight ratio of coolant 20 to water 31 is 1 to 1. The coolant 20 consists of 98% ammonium, nitrate 1% sodium carboxyl methyl cellulose, and 1% sodium chloride. These constituents are pre-mixed to form a particle like material.

In use, press (or knead) bag 10 to break the water bag 30. Instantly, a chemical reaction occurs as the coolant 20 mixes with water 31 released from water bag 30. Such chemical reaction is capable of cooling a contact object at about 26° C. instantly. Thus, it may well serve as a soothing means in an emergency.

A plurality of advantages and features of the cold pack of the invention are detailed below. For example, the constituents of coolant 20 are organic chemicals. As such, the used coolant 20 may be diluted by water to serve as fertilizer for raising plants. This is an environmental protection functionality. Also, the cold pack may give a fresh to a somewhat tired driver. Further, the cold pack may serve as a portable refrigerator to cool certain foods or drinks while outing for a picnic. It is important to note that the coolant 20 has an anti-caking feature. That is, it is not subject to solidification due to moisture, heat, or pressure. Moreover, an organic anionic material is contained in coolant 20. As such, it is capable of melting in water instantly. In addition, a natural inorganic mineral is formed on the particles of coolant 20 for preventing air from condensing therearound. Additionally, the pouring density is 0.670±0.03 (i.e., 0.64 to 0.70) and fuel oil retention capacity is 11% among the constituents of coolant 20.

While the invention herein disclosed has been described by means of specific embodiments, numerous modifications and variations could be specific embodiments, numerous modifications and variations could be made thereto by those skilled in the art without departing from the scope and spirit of the invention set forth in the claims.

What is claimed is:

1. A plastic cold pack being a plastic envelop holding a particle like coolant and a water bag filled therein:

the water bag being filled with water; and the particle like coolant consisting of ammonium nitrate, sodium carboxyl methyl cellulose, and sodium chloride, whereby the pressing and kneading of the cold pack breaks the water bag such that a cooling reaction instantly occurs as the coolant mixes with water released from the water bag.

2. The cold pack of claim 1, wherein the weight ratio of the coolant to water in the water bag is 1 to 1.

3. The cold pack of claim 1, wherein the ammonium nitrate has a weight percentage of 98% of the coolant, the sodium carboxyl methyl cellulose has a weight percentage of 1% of the coolant, and the sodium chloride has a weight percentage of 1% of the coolant.

* * * * *